Patented June 30, 1942

2,288,181

UNITED STATES PATENT OFFICE 2,288,181

METHOD OF MANUFACTURING ETHER ALCOHOLS

Kurt Burgdorf, Herbert Frotscher, and Hubert Machon, Chemnitz, Germany, assignors to American Hyalsol Corporation, Wilmington, Del., a corporation of Delaware No Drawing. Application February 23, 1939, Serial No. 257,962. In Germany February 23, 1938

8 Claims. (Cl. 260—615)

The present invention relates to improvements in or relating to the manufacture of ether alcohols, ether acids and ether esters.

According to the present invention we provide a method of manufacturing ether alcohols of the general formula (RO)$_x$Alk(OH)$_y$ including the step of subjecting to catalytic hydrogenation compounds of the general formula (RO)$_x$.Alk(COOR')$_y$ where R represents a substituted or unsubstituted hydrocarbon residue, Alk represents a polyvalent aliphatic residue, R' represents an alkyl residue, alkali metal or hydrogen and $x$ and $y$ are equal or unequal whole numbers preferably from 1 to 6.

The compounds (RO)$_x$.Alk(COOR')$_y$ may be prepared according to the invention by reacting compounds of the general formula ROM with compounds of the general formula Hal$_x$.Alk.(COOR')$_y$ or by reacting compounds of the general formula R.Hal. with compounds of the general formula (MO)$_x$.Alk.(COOR')$_y$, where M denotes alkali metal, Hal. denotes halogen and R, Alk. $x$, $y$ and R' have the meanings hereinbefore specified.

According to a further feature of the invention, compounds of the general formula (RO)$_x$.Alk.(OH)$_y$ are manufactured by reacting compounds of the general formula ROM with compounds of the general formula Hal$_x$.Alk.(COOR')$_y$ or by reacting compounds of the general formula R.Hal. with compounds of the general formula (MO)$_x$.Alk.(COOR')$_y$ and, in either case, subjecting the reaction products to catalytic hydrogenation.

As hydrocarbon residues (R) referred to in the foregoing, i. e., hydrocarbon residues of the alkali metal alcoholates or phenolates or the hydrocarbon halides, the following may be mentioned by way of example: alkyl radicals such as propyl, amyl, octyl, dodecyl, hexadecyl and others or branched chain residues such as isopropyl, the various isohexyl, isodecyl, isotetradecyl, isooctadecyl and the like, or residues with tertiary carbon atoms such as tertiary butyl, tertiary amyl, diisobutyl, triisobutyl, and tertiary ethyl-hexyl residues. As examples of cycloaliphatic, aliphatic-cycloaliphatic, or aliphatic-aromatic residues may be mentioned, the cyclohexyl and alkylcyclohexyl residues, the tetrahydro-and decahydro-naphthyl residues, the benzyl, diphenylmethyl, menaphthyl and tetrahydro-menaphthyl residues. Among the aromatic residues the following may be mentioned as examples: the residues of benzene, toluene, xylene, naphthalene, phenanthrene, anthracene, diphenyl and the like. The radicals represented by R may if desired also contain other atoms or atom groups, such for example as oxygen, sulphur or nitrogen or their known combinations with one another or with hydrogen.

As examples of polyvalent aliphatic hydrocarbon residues (alk.) may be mentioned, ethylene, propylene, butylene, amylene, octalene, dodecylene, and hexadecylene residues, as well as branched chain alkylene residues such as isopropylene, isohexylene, isooctylene, isotetradecylene, and isooctadecylene residues. Further examples are alkylene residues with tertiary carbon atoms, such for example as tertiary butylene, tertiary amylene, triisobutylene and tertiary ethylhexylene residues.

The alkali metal atom of the compound hereinbefore referred to which may be employed for the preparation of the ether alcohols, esters or acids may be sodium or other alkali metal, or if desired the alkali metal alcoholate may be replaced by the reaction components which may be employed for their production, such for example as a mixture of phenol and potassium carbonate.

The reactions may be carried out with or without the use of organic solvents. In many cases the reactions of the halogen compounds with the alkali metal compounds can be carried out at least for the most part at ordinary temperature. If desired however, even in such cases the reaction may be accelerated by the use of increased temperatures.

The catalytic hydrogenation of the ether acids or ether esters may be carried out by the action of hydrogen under high pressure, and at elevated temperatures in the presence of hydrogenation catalysts, substantially under conditions such as are usual in the catalytic hydrogenation of high molecular fatty acids and their esters to produce the corresponding fatty alcohols.

In order that the invention may be well understood, the following examples will now be given by way of illustration only:

Example 1

23 parts by weight of sodium are dissolved in 600 parts by weight of $n$ butanol. After cooling with ice, 175 parts by weight of chloracetic acid butyl ester are added, a portion at a time to the alcoholate solution formed. Sodium chloride separates out at once. The temperature is maintained below 25° C.

After standing overnight the reaction mixture is heated for about two hours on the water bath, until it reacts neutrally. It is then poured into water and the sodium chloride goes into solution. The aqueous solution is separated and twice extracted with ether. The water insoluble portion which comprises besides butoxyacetic acid butyl ester also butanol and excess chloracetic acid butyl ester, is after drying over sodium sulphate, freed from ethyl ether and fractionated. 150 parts by weight (80% of theoretical yield) of pure butoxyacetic acid butyl ester with a saponification number of 297 (calculated 298) are obtained.

The butoxyacetic acid butyl ester is introduced into an autoclave with 10% of an iron and chromium containing copper catalyst and hydrogen is forced in to a pressure of 130 atmospheres. The autoclave is then heated to 280° C. whereby the pressure rises to a maximum of 243 atmospheres. After a total reaction period of 3 hours the autoclave is allowed to cool and the butanol is distilled off. The hydrogenation product of butoxyethyl alcohol has a hydroxyl number of 463 (calculated 472) and a boiling point at 7 mm. mercury pressure of 54–58° C.

Example 2

Equal parts by weight of isooctylcresol, chloracetic acid ethyl ester and anhydrous potassium carbonate are heated with stirring for several hours at 130–140° C. The excess chloracetic acid ethyl ester is then first distilled off and then the ethyl ester of methyl-isooctyl-phenoxy-acetic acid which has been formed.

By catalytic reduction of this product with the acid of a copper chromium catalyst at 250–260° C. and about 130 atmospheres until no further hydrogen is taken up, the mono-methyl-isooctyl cyclohexyl ether of ethylene glycol is obtained. The yield is approximately quantitative.

In a similar manner by reaction of technical cresol with chloracetic acid and potassium carbonate, cresoxy acetic acid can be obtained which in the form of its butyl ester can be reduced to methyl-cyclohexyl-oxyethyl alcohol.

Example 3

2-bromo-dodecane acid-1 is boiled under reflux with three times the molecular proportion of sodium butylate using anhydrous butyl alcohol as a solvent until the separation of sodium bromide is approximately completed. The butyl alcohol is distilled off and the decylbutoxyacetic acid is set free by means of mineral acid. It is then washed, dried and subjected to distillation. By catalytic hydrogenation as described in Examples 1 and 2, the monobutyl ether of decylethylene glycol is obtained from the acid.

Example 4

12-bromo-octadecane acid-1 is dissolved in isopropyl alcohol and boiled under reflux with 2½ times the molecular quantity of a solution of sodium isopropylate in isopropyl alcohol, until the separation of sodium bromide is completed. The excess isopropyl alcohol is distilled off and the ether acid formed is separated by means of mineral acid. It is catalytically hydrogenated under the conditions described in Examples 1 and 2 whereby the isopropyl ether of hexyl-dodecamethylene glycol is obtained.

In a similar manner for example from the sodium compound of tartronic acid diethyl ester or of mucic acid dimethyl ester and dodecyl bromide, glycerine-dodecyl ether or hexite dodecyl ether may be obtained through dodecyl oxy-malonic acid diethyl ester or the dodecyl ether of mucic acid dimethyl ester.

The invention is also applicable to carbohydrate derivatives of the type of cellulose glycollic acid so that a cellulose residue substituted glycol, in some cases partly degraded may be obtained.

The process for the production of ether alcohols according to the present invention has an important advantage over the known methods of production of ether alcohols by the action of alkylene oxide or alkylene chlorhydrin on alcohols or phenols in that by means of the new method pure unitary compounds can be obtained whilst the old methods without exception yield complicated mixtures in which not only one alkylene oxide residue, but several of them are added on with formation of variously long hydrocarbon chains interrupted several times by oxygen atoms. Such mixtures are very difficult to separate and the yields of the simple ether alcohols are poor.

The compounds obtained according to the present invention may be employed as additions to washing and wetting out agents, as well as to assistants for the textile, leather, furriery and paper industries, and also as starting materials for the production of water soluble capillary active substances for example by sulphonation.

We claim:

1. A method of manufacturing ether alcohols of the general formula $(RO)_x.Alk.(OH)_y$ including the step of subjecting to catalytic hydrogenation compounds of the general formula $(RO)_x.Alk.(COOR')_y$ where R represents a member of the group consisting of substituted and unsubstituted hydrocarbon radicals, Alk represents a polyvalent aliphatic residue, R' represents a member of the group consisting of an alkyl residue, alkali metal and hydrogen and $x$ and $y$ are whole numbers preferably from 1 to 6.

2. A method of manufacturing ether alcohols of the general formula $(RO)_x.Alk.(OH)_y$ by reacting compounds of the general formula ROQ, wherein R is a hydrocarbon radical and Q is selected from the group consisting of alkali metals and hydrogen, where Q is hydrogen the compound ROQ being in admixture with a compound which in the reaction displaces the hydrogen with an alkali metal atom, with compounds of the general formula $Hal_x.Alk.(COOR')_y$, wherein Hal is a hydrogen atom, Alk is a polyvalent aliphatic radical, R' is an akyl radical and $x$ and $y$ are whole numbers from 1 to 6, and subjecting the resulting ether compound to catalytic hydrogenation.

3. A method of manufacturing ether alcohols of the general formula $(RO)_x.Alk.(OH)_y$ by reacting compounds of the general formula ROM, wherein R is a hydrocarbon radical and M is an alkali metal, with compounds of the general formula $Hal_x.Alk.(COOR')_y$, wherein Hal is a halogen atoms, Alk is a polyvalent aliphatic radical, R' is an alkyl radical and $x$ and $y$ are whole numbers from 1 to 6, and subjecting the resulting ether compound to catalytic hydrogenation.

4. The method of manufacturing ether alcohols of the general formula $(RO)_x.Alk.(OH)_y$ by reacting compounds of the general formula ROH, wherein R is a hydrocarbon radical in admixture with a compound which in the reaction displaces the hydrogen with an alkali metal atom with compounds of the general formula $$Hal_x.Alk.(COOR')_y$$

wherein Hal is a halogen atom, Alk is a polyvalent aliphatic radical, R' is an alkyl radical and $x$ and $y$ are whole numbers from 1 to 6, and subjecting the resulting ether compound to catalytic hydrogenation.

5. A method of producing water soluble, capillary active substances which comprises producing ether alcohols of the general formula $$(RO)_x.Alk.(OH)_y$$

including the step of subjecting to catalytic hydrogenation compounds of the general formula $(RO)_x.Alk.(COOR')_y$ where R represents a hydrocarbon residue, Alk represents a polyvalent aliphatic residue, R represents a member of the group consisting of an alkyl residue, alkali metal and hydrogen, and $x$ and $y$ are whole numbers preferably from 1 to 6, and sulfonating the resulting ether alcohols.

6. A method of manufacturing ether alcohols of the general formula $(RO)_x.Alk.(OH)_y$ by reacting compounds of the general formula ROQ, wherein R is a hydrocarbon radical and Q is selected from the group consisting of alkali metals and hydrogen, where Q is hydrogen the compound ROQ being in admixture with a compound which in the reaction displaces the hydrogen with an alkali metal, with compounds of the general formula $Hal_x.Alk.(COOR')_y$, wherein Hal is a hydrogen atom, Alk is a polyvalent aliphatic radical, R' is an alkyl radical and $x$ and $y$ are whole numbers from 1 to 6, subjecting the resulting ether compound to catalytic hydrogenation, and sulfonating the resulting ether alcohols.

7. A method as claimed in claim 3 in which the ether alcohols produced are subjected to sulphation.

8. A method of manufacturing ether alcohols of the general formula (RO) alk (OH) including the step of subjecting to hydrogenation at about 250° C. under high pressure and in the presence of a copper chromium catalyst, compounds of the general formula (RO) alk (COOR') where R represents a hydrocarbon radical, "Alk" represents a divalent aliphatic hydrocarbon radical and R' represents a member of the group consisting of hydrogen and alkyl.

KURT BURGDORF.
HERBERT FROTSCHER.
HUBERT MACHON.